Patented Dec. 24, 1935

2,025,249

UNITED STATES PATENT OFFICE 2,025,249

FLEXIBLE ABRASIVE IMPLEMENT

Ralph C. Shuey, Downers Grove, Ill., assignor to Bakelite Corporation, New York, N. Y., a corporation of Delaware No Drawing. Application May 6, 1930, Serial No. 450,323

6 Claims. (Cl. 51—280)

This invention relates to the preparation of abrasive implements having a flexible base such as sandpapers and the like. More particularly it relates to abrasive papers and equivalent devices that are characterized by resistance to moisture so as to be suitable for use in "water-sanding" processes.

Sandpapers and similar abrasive implements have been and at the present time are to a large extent prepared with glue as a binder for securing the abrasive to the paper or cloth base. The use of glue, however, involves a number of difficulties. It gives a rigid paper unless made flexible with glycerine or equivalent means, and it requires a restricted moisture content; it is customary for this reason to make what are known as summer and winter papers to correspond with the average humidity condition of those seasons. A most serious objection is its water solubility which prevents its use in abrading or polishing the painted surfaces of automobile bodies and in similar "water-sanding" processes. For this reason papers made with a drying oil bond such as boiled linseed oil have been proposed; while such a bond requires a relatively long period for drying of at least 4 to 5 hours as contrasted to a fraction of an hour when a glue bond is used, oil bonds are primarily objectionable on account of the continuance of the oxidizing action and the consequent short life of the paper. The glue bond has therefore retained its preeminence in those fields for which it is adapted in spite of its defects.

The desirability of a bond immune both to moisture and to atmospheric influences has long been recognized. A bond of this nature is the subject matter of the Baekeland Patent 942,808 granted Dec. 7, 1909 directed to abrasive implements prepared with a phenolic condensation product or resinoid as a binder. Such a binder is inert to the usual solvents and the oxygen of the atmosphere and it is likewise characterized by infusibility. It has the further significant advantage that it can be deposited from solutions in volatile solvents and thereafter changed upon evaporation of solvent to an infusible insoluble condition by the application of heat. But the film so deposited and consisting of a phenol formaldehyde condensation product alone is characterized by brittleness, and it is therefore unsuitable to applications where flexibility of the base is to be retained.

Flexibility can, however, be imparted to phenolic condensation products without objectionable impairment of the properties of insolubility inertness to atmospheric conditions and infusibility. I have found that phenolic condensation products with this added property of flexibility can be used in the manufacture of abrasive implements having a paper or cloth base, and furthermore that abrasive implements can be so made that are surprisingly superior to papers with glue or drying oil binders in that they have a much longer abrading life when used with water and do not as quickly deteriorate with age.

A phenolic condensation product found particularly suitable for the manufacture of flexible implements and therefore preferred to other products of the phenolic resinoid type, is the coating composition obtained by reacting tung oil or other fatty oil with a phenol and thereupon including formaldehyde or other methylene-containing agent and a suitable solvent, such as benzol and alcohol, and described in a patent to Byck No. 1,590,079 granted June 22, 1926. Such a composition is applied to the flexible base by a coating machine, the abrasive is sprinkled on a coating and the paper is then passed through an oven heated to about 135° C. to drive off the volatile matter and transform the resinoid to its final condition. A coating of this character will dry to a non-tacky film in less than one-half hour. Sizing and backing coats of the same or other composition can be applied as and when desired. This binder is superior to glue in that it is not affected by water or softened by heat, and it is superior to an oil bond in that it does not depend upon air oxidation for drying. Insofar as drying is concerned the composition falls in the class of spirit varnishes which form homogeneous films upon evaporation of a solvent and in that respect differs from oil varnishes that require oxidation of an oil to yield a film.

Flexibility together with the properties inherent in phenolic condensation products can also be attained to a surprising degree by first applying to the base a coat of a varnish made of boiled linseed oil, or one containing linseed oil or other drying oil and a gum, and hardening this coating as by baking; a solution of a phenolic condensation product, or the product above described and obtained by reacting a fatty oil, a phenol and a methylene-containing agent, is then applied over the oil varnish coating, and after the grit is sprinkled on it it is baked to transform the phenolic condensation product to its infusible, insoluble condition. Or the grit can be secured by the oil varnish coat and the phenolic condensation product then applied; in this case the top coat is preferably thinned so as not to completely cover the grains. This procedure results in a flexible tough oil coating adhering to the base while the protective surface coat that is strongly adherent to the oil varnish coat possesses the inertness and resistance of a phenolic condensation product.

Flexibility to a greater or less extent is also imparted to a phenolic condensation product by the inclusion of say 3 to 20 per cent or more of plasticizing or softening agents, such as aniline, tricresyl phosphate, dibutyl phthalate, etc.; agents of this nature, however, appear to have a tendency to reduce the strength or adhesion of the bond to the grains in proportion to the amount included and to exhibit an increase in plasticity with a rise in temperature. These compositions therefore are not regarded as desirable as those heretofore mentioned for the purposes of this invention.

An abrasive paper or cloth made in accordance with this invention with a bond having combined therein the characteristics of flexibility and freedom from softening or becoming tacky through rise in temperature under working conditions in addition to being moisture-proof and resistant to air oxidation is evidently one of the utmost importance to the sanding or abrasive art. The non-flowing or non-softening character insures the cutting action of the grains for they do not become coated, and the absence of tackiness avoids the retention of dust to fill or clog the interstices and destroy the free-cutting action. The lack of solubility in water or oil adapts the paper for use with these media; an actual test made with water in comparison with an oil-bonded paper under like conditions showed an abrading life of more than double that of the oil-bonded paper. The resistance to air-oxidation means a long shelf life and retention of the initial flexibility of the paper.

Abrasive implements generally take the form of sheet materials to which the abrasive is affixed. But the invention includes other forms such as polishing wheels made from a number of fabric discs carrying abrasive grains on their peripheries and felt rimmed wheels having abrasive secured thereto. Furthermore the invention is not necessarily restricted to applications wherein an abrasive is bonded to a flexible base, for other products of a flexible nature requiring the inclusion of a coating possessing water resistance and other properties hereindescribed come within its purview as defined by the claims which follow; for example, granular materials of the nature of crushed stone, slate, etc. can be bonded as hereindescribed to a flexible base to produce roofing compositions and analogous manufactures.

I claim:

1. Abrasive implement characterized by flexibility, substantial inertness to atmospheric conditions and resistance to moisture and heat comprising in combination a flexible base, abrasive grains, and a binder for securing the grains to the base, said binder comprising multiple layers, one being essentially a varnish of the drying oil type adherent to the base and the other a coating on the exposed surface of the varnish layer that is essentially a resinous product of the heat-hardening phenol-aldehyde type reacted by heating to the insoluble state whereby the varnish layer is protected from the action of atmospheric oxygen.

2. Abrasive implement characterized by flexibility, substantial inertness to atmospheric conditions and resistance to moisture and heat comprising in combination a flexible base, abrasive grains, and a binder for securing the grains to the base, said binder comprising multiple layers, one being essentially a varnish of the drying oil type adherent to the base and hardened in situ by heating and the other a coating on the exposed surface of the varnish that is essentially a resinous product of a heat-hardening phenol-aldehyde type reacted by heating to the insoluble state.

3. Article of manufacture characterized by flexibility, substantial inertness to atmospheric conditions, resistance to moisture and heat comprising in combination a flexible base and a coating for said base, said coating comprising multiple layers, one being essentially a varnish of the drying oil type adherent to the base and the other a coating on the exposed surface of the varnish layer that is essentially a resinous product of the heat-hardening phenol-aldehyde type reacted by heating to the insoluble state whereby the varnish layer is protected from the action of atmospheric oxygen.

4. Process of preparing an article of manufacture suitable as an abrasive implement characterized by flexibility, substantial inertness to atmospheric conditions and resistance to moisture and heat which comprises coating a flexible base with a varnish that is essentially of the drying oil type applying to said coating a granular filler and a layer on the exposed surface of said varnish that is essentially a resinous product of the heat-hardening phenol-aldehyde type, and baking the article to harden the resinous product to an insoluble state whereby the varnish layer is protected from the action of atmospheric oxygen.

5. Process of preparing an article of manufacture suitable as an abrasive implement characterized by flexibility, substantial inertness to atmospheric conditions and resistance to moisture and heat which comprises coating a flexible base with a varnish that is essentially of the drying oil type, hardening the varnish in situ by heating, applying to said coating a granular filler and a layer on the exposed surface of said varnish that is essentially a resinous product of the heat-hardening phenol-aldehyde type, and baking the article to harden the resinous product to an insoluble state.

6. Process of preparing an article of manufacture characterized by flexibility, substantial inertness to atmospheric conditions and resistance to moisture and heat which comprises coating a flexible base with a varnish that is essentially of the drying oil type, applying to said coating a layer on the exposed surface of said varnish that is essentially a resinous product of the heat-hardening phenol-aldehyde type, and baking the article to harden the resinous product to an insoluble state whereby the varnish layer is protected from the action of atmospheric oxygen.

RALPH C. SHUEY.